United States Patent [19]

Kusano et al.

[11] Patent Number: 5,801,498
[45] Date of Patent: Sep. 1, 1998

[54] CONTROL SYSTEM FOR ELECTRIC VEHICLE

[75] Inventors: Katsuyuki Kusano; Hisahiro Ito; Tomoyuki Itoh, all of Saitama, Japan

[73] Assignee: Honda Giken Kogyo Kabushiki Kaisha, Tokyo, Japan

[21] Appl. No.: 639,475

[22] Filed: Apr. 29, 1996

[30] Foreign Application Priority Data

Apr. 28, 1995 [JP] Japan .................... 7-105435

[51] Int. Cl.$^6$ .................... B60L 3/00; H02P 5/41
[52] U.S. Cl. .................... 318/139; 318/376; 318/442
[58] Field of Search .................... 318/139, 106, 318/798–803, 807, 810, 811, 375, 376, 377, 442, 500; 180/65.1, 65.8

[56] References Cited

U.S. PATENT DOCUMENTS

| | | | |
|---|---|---|---|
| 3,959,701 | 5/1976 | Bader | 318/139 |
| 5,170,105 | 12/1992 | Kumar | 318/362 |
| 5,285,862 | 2/1994 | Furutani et al. | 318/139 X |
| 5,619,107 | 4/1997 | Shinohara et al. | 318/139 |

*Primary Examiner*—Bentsu Ro
*Attorney, Agent, or Firm*—Lyon & Lyon LLP

[57] ABSTRACT

A motor control device for controlling the driving and regenerative operation of a motor includes CPU, ROM, RAM and a back-up RAM. An electric power is normally supplied from a subsidiary battery through a second regulator to the back-up RAM. An electric power is also supplied to the CPU, the ROM and the RAM through a main switch and a first regulator, on the one hand, and through the first regulator and a transistor which is turned ON when the number of revolutions of the motor becomes equal to or larger than a predetermined value, on the other hand. Therefore, even if the main switch is opened during traveling of a vehicle at a high speed, the counter-electromotive force of the motor can be decreased by the motor control device which is supplied with the electric power through the transistor to maintain its function, thereby preventing damage to an inverter.

7 Claims, 7 Drawing Sheets

CONTROL SYSTEM FOR ELECTRIC VEHICLE

BACKGROUND OF THE INVENTION

1. Field of the Invention

The present invention relates to a control system for an electric vehicle for controlling driving and regenerative operation of a motor through an inverter mounted between a battery and the motor.

2. Description of the Related Art

In general, a vehicle using an engine as a driving source is provided with an electronic control unit for controlling both an output from the engine and shifting of an automatic transmission, and such electronic control unit includes two (first and second) independent power source circuits. The first power source circuit is used for operating the electronic control unit, while the second power source circuit is used for storing and retaining various information. The first power source circuit is turned ON and OFF by operation of an ignition switch, while the second power source circuit is always in an ON state for storing and retaining purpose.

In an electric vehicle using a motor as a driving source, in general, a counter-electromotive force generated by the motor is dropped to extend the rotatable area of the motor toward a high revolution-number by performing a field weakening control in a range of a high number of revolutions of the motor.

In the above conventional vehicles, the first and second power source circuits are independent from each other and do not help each other. For this reason, if one of the power source circuits fails, the function of the electronic control unit itself or the information stored therein are lost.

In the electric vehicle using the motor as the driving source, if for example, a main switch is opened during traveling of the vehicle with the motor rotating at a high speed, no electric power is supplied from the first power source circuit, so that the function of the electronic control unit for controlling the motor is stopped. For this reason, it is impossible to decrease the counter-electromotive force of the motor by the field weakening control and hence, there is a possibility that the inverter may be adversely affected by the counter-electromotive force.

SUMMARY OF THE INVENTION

Accordingly, it is an object of the present invention to reliably perform the back-up of a power source circuit of a motor control means in an electric vehicle.

To achieve the above object, according to the present invention, there is provided a control system for an electric vehicle, comprising: an inverter which is disposed between a battery and a motor, and which converts a DC electric power of the battery into an AC electric power to supply it to the motor during driving of the motor and converts an AC electric power generated by the motor into a DC electric power to supply it to the battery during regenerative operation of the motor; a motor control means for controlling the driving and regenerative operation of the motor through the inverter and for conducting a field weakening control in a high revolution range of the motor; a first power source circuit for supplying an electric power to the motor control means by closing a power source switch operated by a driver; a motor revolution-number sensor for detecting the number of revolutions of the motor; and a second power source circuit for supplying an electric power to the motor control means when the number of revolutions of the motor detected by the motor revolutions-number sensor is equal to or larger than a predetermined value.

With the above arrangement, even if the power source switch is opened and as a result, no electric power is supplied from the first power source circuit to the motor control means, an electric power is supplied to the motor control means through the second power source circuit, if the number of revolutions of the motor is equal to or larger than the predetermined value. Therefore, the control of the motor can be continued until the number of revolutions of the motor is smaller than the predetermined value and the counter-electromotive force is sufficiently decreased, thereby avoiding damage to the inverter.

In addition, according to the present invention, there is provided a control system for an electric vehicle, Comprising: an inverter which is disposed between a battery and a motor, and which converts a DC electric power of the battery into an AC electric power to supply it to the motor during driving of the motor and converts an AC electric power generated by the motor into a DC electric power to supply it to the battery during regenerative operation of the motor; a motor control means for controlling the driving and regenerative operation of the motor through the inverter and for conducting a field weakening control in a high revolution range of the motor; a power source switch operated by a driver to supply an electric power to the motor control means; a motor revolution-number sensor for detecting the number of revolutions of the motor; and a power source circuit for supplying an electric power to the motor control means, when the power source switch is in a closed state, or when the number of revolutions of the motor detected by the motor revolution-number sensor is equal to or larger than a predetermined value.

With the above arrangement, if the power source switch is in the closed state, or if the number of revolutions of the motor is equal to or larger than the predetermined value, the electric power is supplied to the motor control means through the power source circuit. Therefore, even if the power source switch is opened in a condition in which the number of revolutions of the motor is equal to or larger than the predetermined value, the control of the motor can be continued until the number of revolutions of the motor is smaller than the predetermined value and the counter-electromotive force is sufficiently decreased, thereby avoiding damage to the inverter.

In addition to the above arrangement, when the power source switch is in an opened state, the motor control means controls the driving torque of the motor into 0. Thus, it is possible to reliably prevent damage to the inverter due to the counter-electomotive force of the motor and to safely stop the vehicle.

The above and other objects, features and advantages of the invention will become apparent from the following detailed description of preferred embodiments taken in conjunction with the accompanying drawings.

BRIEF DESCRIPTION OF THE DRAWINGS

FIGS. 1 to 6 show a first embodiment of the present invention, wherein:

FIG. 1 is a diagrammatic illustration of the entire arrangement of an electric vehicle;

FIG. 2 is a block diagram of a control system;

FIG. 3 is a block diagram illustrating a circuit arrangement of an electronic control unit;

FIG. 4 is a diagram illustrating a power source circuit;

FIG. 5 a flowchart for explaining the operation; and

FIG. 6 is a time chart for explaining the operation.

DETAILED DESCRIPTION OF THE PREFERRED EMBODIMENTS

Figure 1:
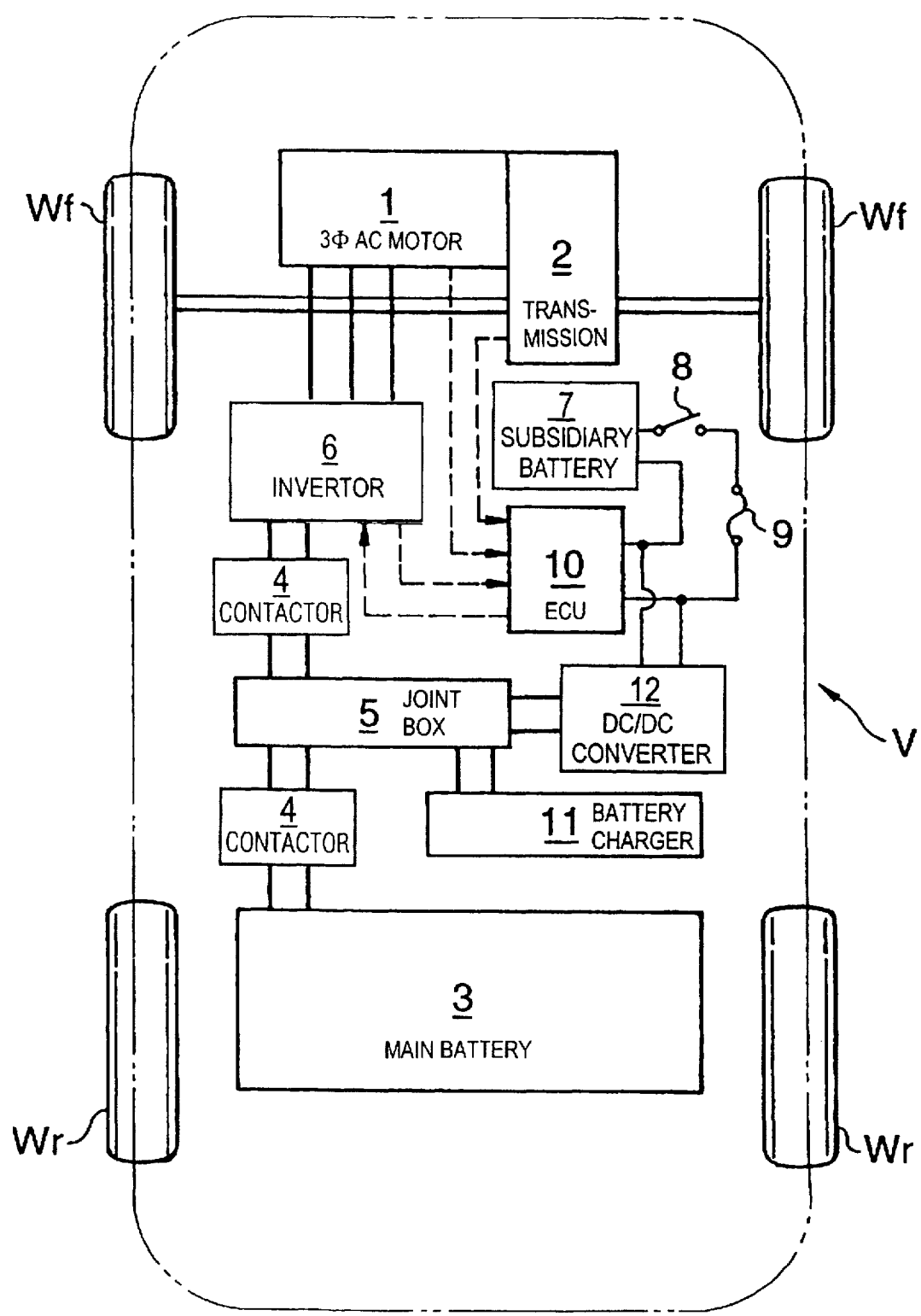
Figure 2:
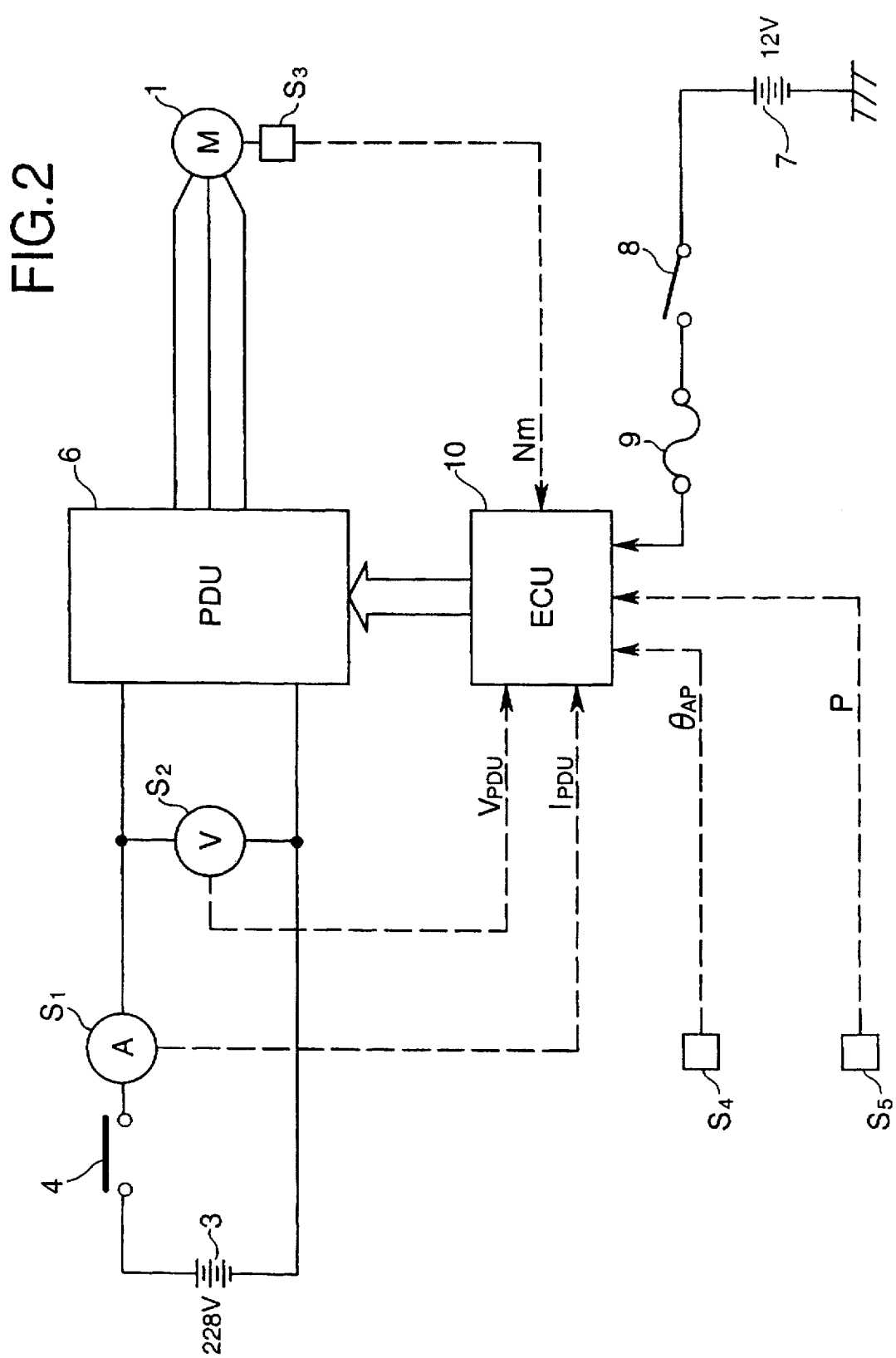

Referring to FIGS. 1 and 2, a four-wheel electric vehicle V includes a pair of left and right rear wheels Wr, Wr as follower wheels, and a pair of left and right front wheels Wf, Wf as driven wheels to which a torque of a three-phase AC motor 1 is transmitted through a transmission 2. A main battery 3, for example, of 228 volts, is mounted at a rear portion of the electric vehicle V and connected to the motor 1 through a contactor 4, a joint box 5, a contactor 4 and an inverter 6 constituting a power drive unit. An electronic control unit 10 is connected to a subsidiary battery 7, for example, of 12 volts through a main switch 8 and a fuse 9 and also connected to the inverter 6 to control a driving torque and a regenerative torque of the motor 1. A battery charger 11 and a DC/DC converter 12 are mounted to charge the subsidiary battery 7 with the electric power of the main battery 3.

In a high-voltage circuit connecting the main battery 3 and the inverter 6, i.e., a DC section of the inverter 6, there are an electric current sensor $S_1$ for detecting an electric current $I_{PDU}$ in the DC section and a voltage sensor $S_2$ for detecting a voltage $V_{PDU}$ in the DC section. The electric current $I_{PDU}$ in the DC section of the inverter 6 detected by the electric current sensor $S_1$ and the voltage $V_{PDU}$ in the DC section of the inverter 6 detected by the voltage sensor $S_2$ are inputted to the electronic control unit 10. A motor revolution-number Nm detected by a motor revolution-number sensor $S_3$, an accelerator opening degree $\theta_{AP}$ detected by an accelerator opening degree sensor $S_4$ and a shift position P detected by a shift position sensor $S_5$ are also inputted to the electronic control unit 10.

The inverter 6 includes a plurality of switching elements. By inputting a switching signal from the electronic control unit 10 to each of the switching elements, during driving of the motor, the DC electric power of the main battery 3 is converted into a three-phase AC electric power and supplied to the motor 1, and when the motor 1 is driven by the wheels (during regenerative operation), a three-phase AC electric power generated by the motor 1 is converted into a DC electric power and supplied to the main battery 3.

The switching signal inputted from the electronic control unit 10 to the switching elements of the inverter 6 is controlled by PWM (a pulse width modulation). In a range of a high number of revolutions of the motor 1, after the duty factor has reached 100%, a field weakening control is carried out. The field weakening control is for applying field electric current components to a primary electric current to be supplied to the motor 1, so that a field is generated in an opposite direction from a field generated by a permanent magnet of the motor 1, so as to reduce the entire field to increase the number of revolutions of the motor 1 into a larger value.

Figure 3:
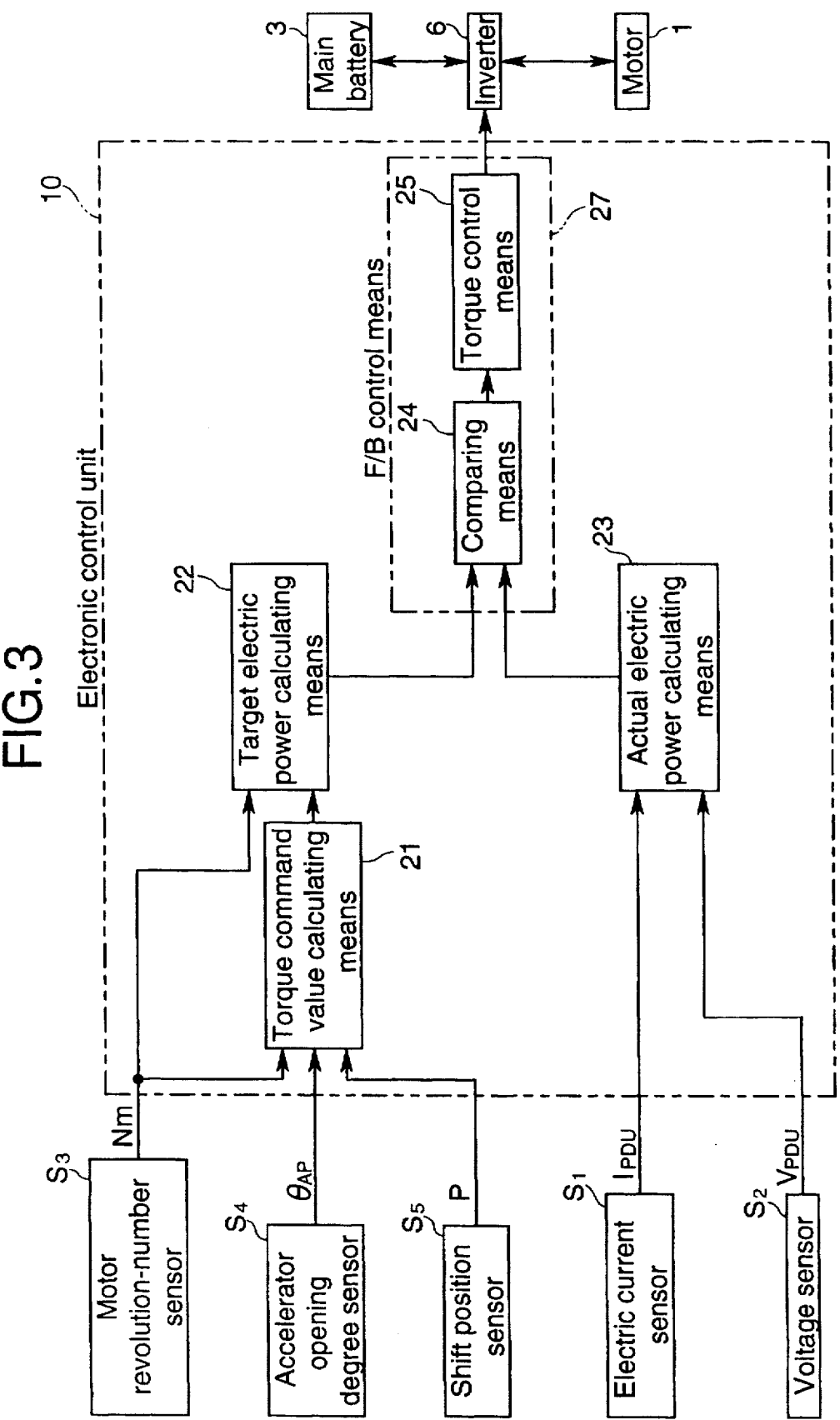

The circuit arrangement and the operation of the electronic control unit 10 will be described below with reference to FIG. 3.

The electronic control unit 10 includes a torque command value calculating means 21, a target electric power calculating means 22, an actual electric power calculating means 23, a comparing means 24 and a torque control means 25.

The comparing means 24 and the torque control means 25 constitute a feed-back control means 27.

The torque command value calculating means 21 calculates a torque command value for a torque which is to be generated in the motor 1 by a driver, for example, by a map searching, based on the motor revolution-number Nm detected by the motor revolution-number sensor $S_3$, the accelerator opening degree $\theta_{AP}$ detected by the accelerator opening degree sensor $S_4$ and the shift position P detected by the shift position sensor $S_5$. The target electric power calculating means 22 calculates a target electric power which is to be supplied to the motor 1, or to be taken from the motor 1 by the regenerative operation, by multiplying the torque command value calculated by the torque command value calculating means 21 and the motor revolutionnumber Nm detected the motor revolution-number sensor $S_3$ and dividing the resulting value by a converting efficiency. The target electric power is of a positive value in one case, and of a negative value in the other case. The positive target electric power corresponds to the case where the motor 1 generates the driving torque, and the negative target electric power corresponds to the case where the motor 1 generates the regenerative torque.

The actual electric power calculating means 23 calculates an actual electric power which is to be inputted to the inverter 6, by multiplying the electric current $I_{PDU}$ in the DC section of the inverter 6 detected by the electric current sensor $S_1$ and the voltage $V_{PDU}$ in the DC section of the inverter 6 detected by the voltage sensor $S_2$. As is the target electric power, the actual electric power is of a positive value in one case, and of a negative value in the other case. The positive actual electric power corresponds to the case where the motor 1 generates the driving torque, and the negative actual electric power corresponds to the case where the motor 1 generates the regenerative torque.

The target electric power calculated by the target electric power calculating means 22 and the actual electric power calculated by the actual electric power calculating means 23 are inputted to the comparing means 24 of the feed-back control means 27, where a deviation between the target and actual electric powers is calculated. The torque control means 25 controls the pulse width of the switching signal inputted to the inverter 6, based on the deviation between the target and actual electric powers calculated in the feed-back control means 27. As a result, the operational state of the motor 1 is subjected to a feed-back control to make the actual electric power coincide with the target electric power.

Figure 4:
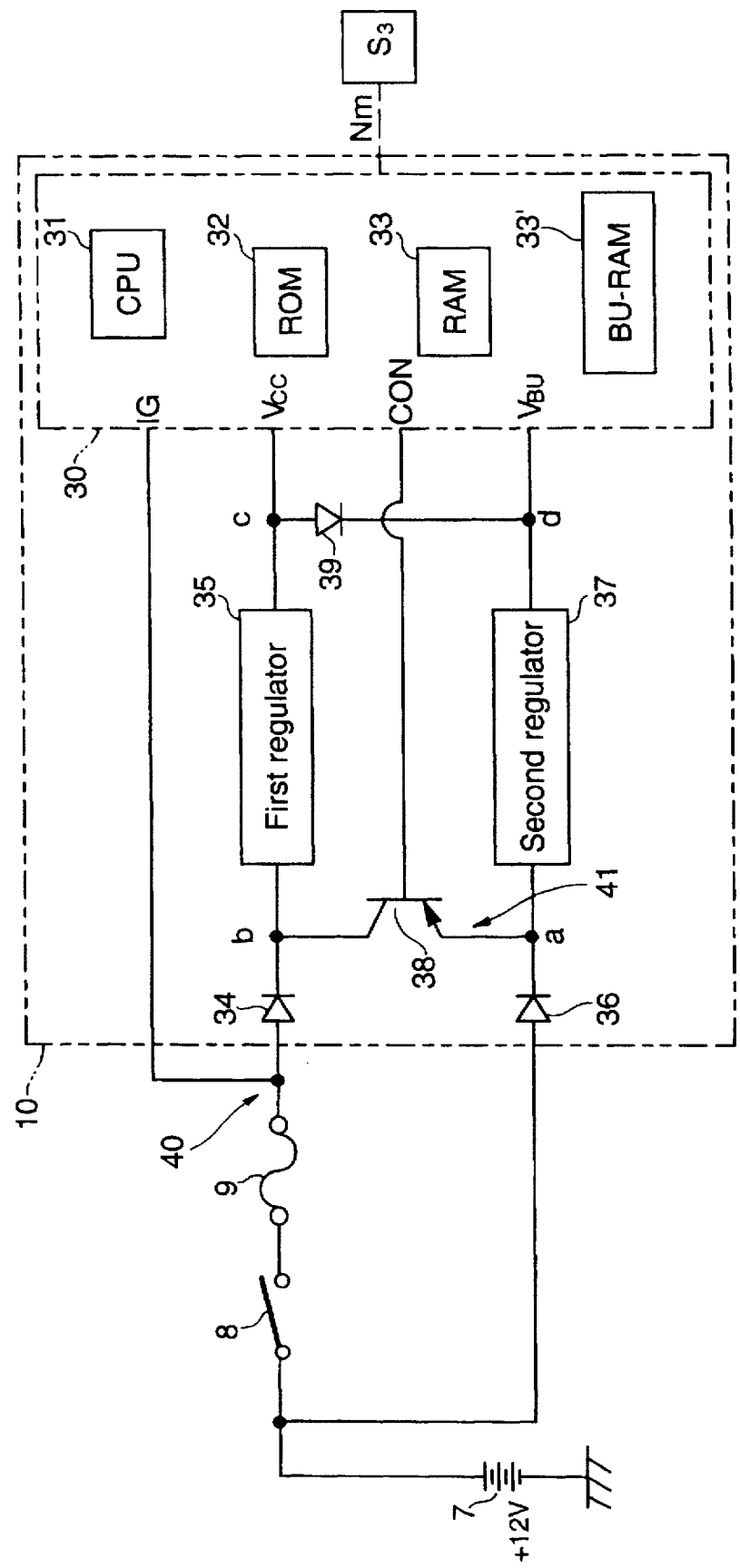

As shown in FIG. 4, the motor control means 30 of the electronic control unit 10 includes a central processing unit 31, a read-only-memory 32 having a motor control program and the like stored therein, a random access memory 33 which temporarily stores controlling data, and a back-up random access memory 33' which stores learning values of the controlling data and results of failure diagnosis even after opening of the main switch 8.

The subsidiary battery 7 is connected to a power source terminal $V_{CC}$ of the motor control means 30 through the main switch 8, the fuse 9, a first diode 34 and a first regulator 35, and supplies power to the central processing unit 31, the read-only-memory 32 and the random access memory 33. Thus, the motor control means 30 can be operated by closing the main switch 8.

The subsidiary battery 7 is also connected to a back-up power source terminal $V_{BU}$ of the motor control means 30 through a second diode 36 and a second regulator 37, and normally supplies power to the back-up random access memory 33'. Thus, the data in the back-up random access memory 33' is retained even after the main switch 8 has been opened to stop the operation of the motor control means 30.

The back-up power source terminal $V_{BU}$ is connected to the first regulator 35 through a third diode 39. Thus, even when the second regulator 37 fails, the power can be supplied to the back-up random access memory 33', if the main switch 8 is in a closed state.

An emitter of a transistor 38 is connected to a point a between the second diode 36 and the second regulator 37, a collector of the transistor 38 is connected to a point b between the first diode 34 and the first regulator 35, and a base of the transistor 38 is connected to a control output terminal CON of the motor control means 30.

If the motor revolution-number Nm inputted from the motor revolution-number sensor $S_3$ to the motor control means 30 becomes equal to or larger than a predetermined value $Nm_{REF}$, a control signal is outputted from the control output terminal CON to the base of the transistor 38 to turn ON the transistor 38.

A circuit extending from the subsidiary battery 7 through the main switch 8, the fuse 9, the first diode 34 and the first regulator 35 to the motor control means 30 constitutes a first power source circuit 40. And a circuit extending from the subsidiary battery 7 through the second diode 36, the transistor 38 and the first regulator 35 to the motor control means 30 constitutes a second power source circuit 41.

A junction point between the fuse 9 and the first diode 34 is connected to a power source monitoring terminal IG of the motor control means 30, so that it is monitored whether an electric power is being supplied from the first power source circuit 40 to the motor control means 30 by closing of the main switch 8.

The operation of the first embodiment of the present invention will be described below with reference to FIGS. 5 and 6.

Figure 5:
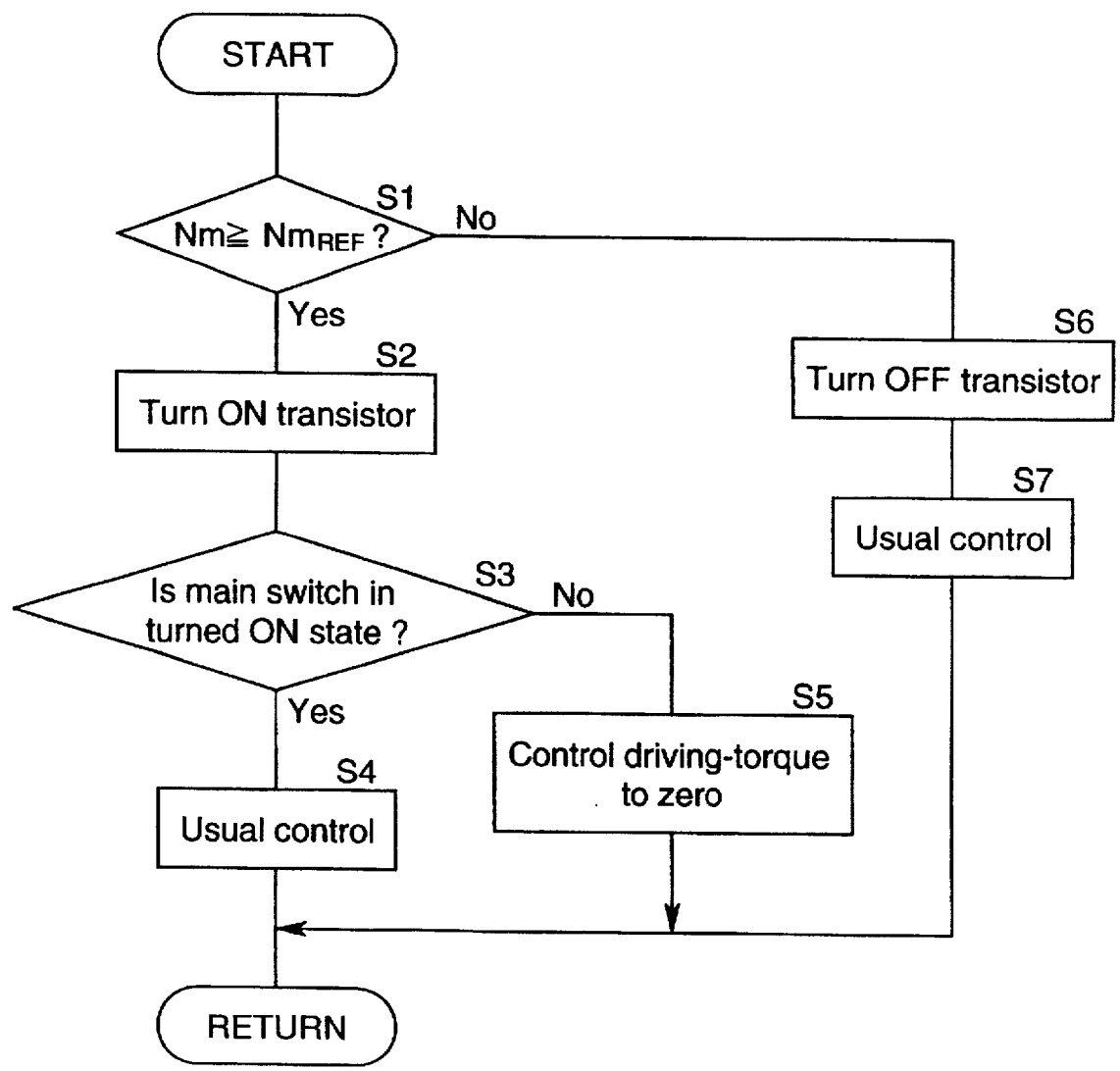
Figure 6:
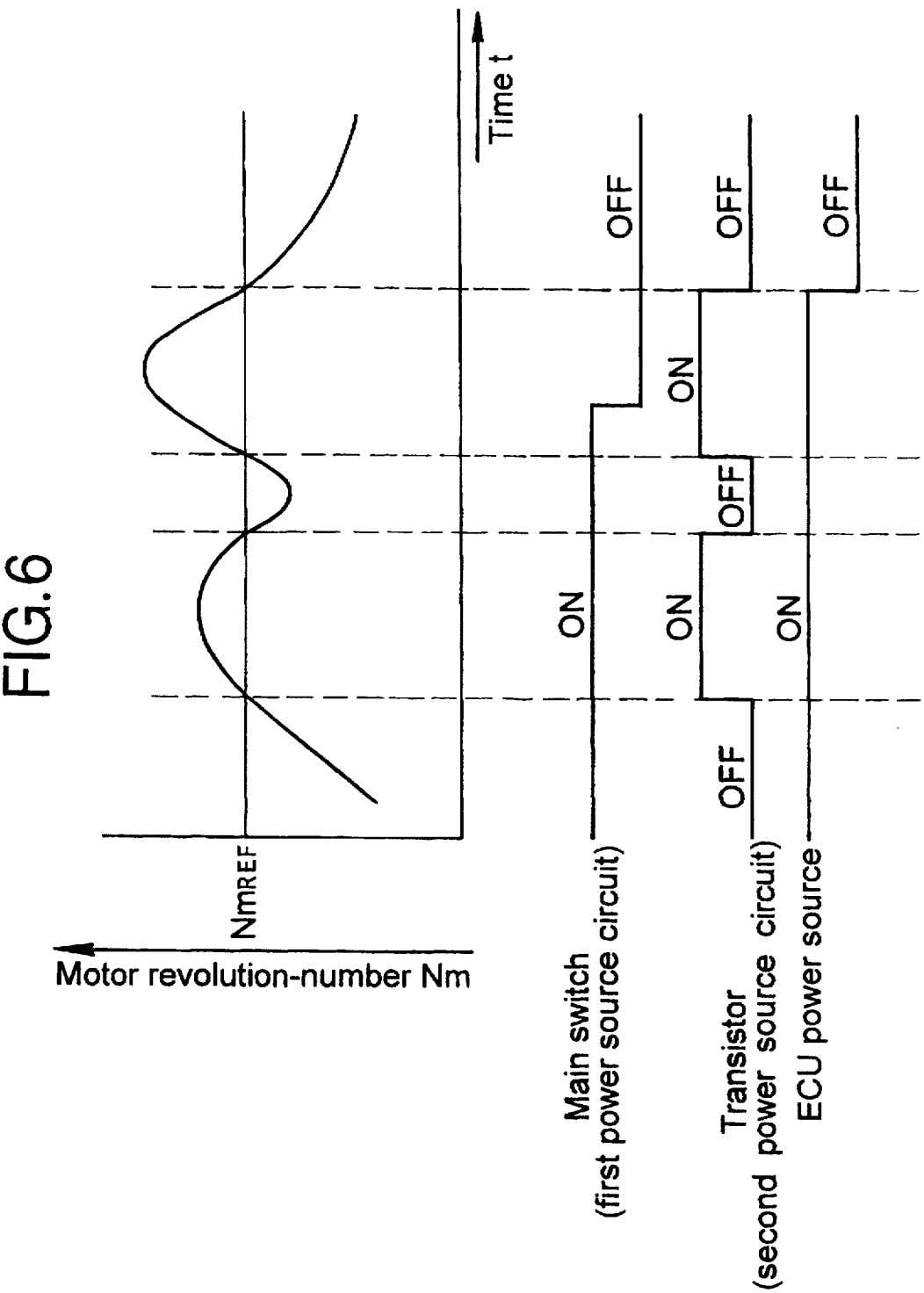

If the main switch 8 is closed, an electric power is supplied from the subsidiary battery 7 through the first power source circuit 40 to the power source terminal $V_{CC}$ of the motor control means 30, whereby a control program shown in the flowchart in FIG. 5 is carried out.

First, at step S1, it is determined whether the motor revolution-number Nm is equal to or larger than the predetermined value $Nm_{REF}$. The predetermined value $Nm_{REF}$ is set at a value slightly lower than the number of revolutions at which the counter-electromotive force generated by the motor 1 becomes equal to the voltage of the main battery 3, when the field weakening control is not carried out.

If the motor revolution-number Nm is equal to or larger than the predetermined value $Nm_{REF}$ at step S1, the control terminal CON is controlled to turn ON the transistor 38 in preparation for the stoppage of the supplying of the electric power from the first power source circuit 40 in a high rotating state of the motor 1. Thus, even when the supplying of the electric power from the first power source circuit is stopped, the motor control means 30 can continue its operation by the electric power being supplied from the second power source circuit 41.

Then, at step S3, it is determined, by confirming a signal from the power source monitoring terminal IG, that the main switch 8 is in the closed state and the motor control means 30 is in operation by the first power source circuit 40. If the motor control means 30 is in operation by the first power source circuit 40, the feed-back control of the motor 1 is carried out at step S4, such that the electric power becomes equal to a target electric power determined by the accelerator opening degree and the like, and the PWM control and the field weakening control in a high rotational range are carried out.

If the motor control means 30 is in operation by the second power source circuit 41 at step S3, it is determined that the opening of the main switch 8 and/or the circuit disconnect of the fuse 9 have occurred, and the target electric power is brought into 0 to perform the feed-back control of the motor 1 at step S5. This causes the driving torque generated by the motor 1 to become 0 irrespective of the accelerator opening degree and the like. At that time, if the counter-electromotive force of the motor 1 exceeds the voltage of the main battery 3, the field weakening control is carried out to suppress the counter-electromotive force of the motor 1, as is the usual feed-back control at step S4.

As a result, even when the main switch 8 has been opened by the driver during traveling of the vehicle and even when the fuse 9 has been blown, i.e. a circuit disconnect occurs, damage to the inverter 6 can be prevented, and the vehicle can safely be stopped.

If the motor revolution-number Nm is smaller than the predetermined value $Nm_{REF}$ at step S1, the control terminal CON is controlled to turn OFF the transistor 38 and to stop the supplying of the electric power from the second power source circuit 41 to the motor control means 30. This is because the motor revolution-number Nm is small and the counter-electromotive force has been dropped and hence, even if the supplying of the electric power from the first power source circuit 40 is stopped, there is no possibility that the inverter 6 may be damaged. Moreover, when the motor revolution-number Nm is lower, the second power source circuit 41 is opened and hence, an increase in dark current (i.e., current that unintentionally flows or leaks from somewhere) can be suppressed to the minimum.

Step S7 is carried out, when the motor control means 30 is in operation by the first power source circuit 40, and as at step S4, the above-described usual feed-back control of the motor 1 is performed at step S7.

Figure 7:
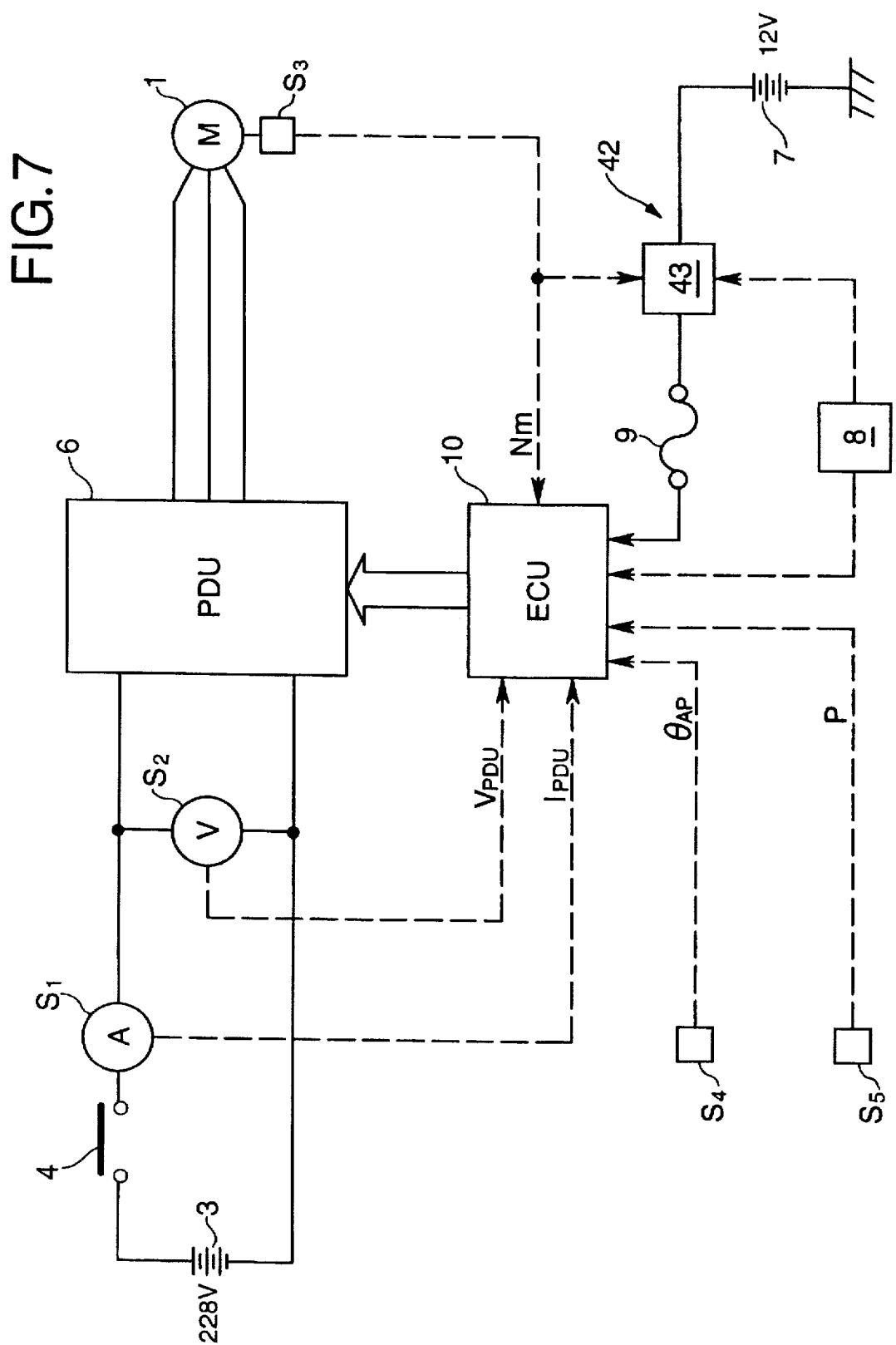
FIG. 7 is a block diagram of a control section, similar to FIG. 2, but according to a second embodiment of the invention.

A second embodiment of the present invention will be described below with reference to FIG. 7.

In the second embodiment, a power source circuit 42 for supplying an electric power from the subsidiary battery 7 to the electronic control unit 10 includes a relay circuit 43. A motor revolution-number Nm detected by the motor revolution-number sensor S3 and a switching signal of the main switch 8 are inputted to the relay circuit 43. The switching signal of the main switch 8 is also inputted to the electronic control unit 10.

Thus, if the main switch 8 is in a closed state, or if the motor revolution-number Nm is equal to or larger than a predetermined value $Nm_{REF}$, the relay circuit 43 is closed to permit an electric power to be supplied from the subsidiary battery 7 to the electronic control unit 10, whereby the usual feed-back control of the motor 1 is carried out. If the motor revolution-number Nm is equal to or larger than a predetermined value $Nm_{REF}$, the supplying of the electric power to the electronic control unit 10 is continued even if the main switch 8 is opened for some reason or other. Therefore, the electronic control unit 10 stops the usual feed-back control and performs a control such that the output torque from the motor 1 becomes zero, thereby preventing damage to the inverter due to the counter-electromotive force of the motor 1.

Although the embodiments of the present invention have been described in detail, it will be understood that the present invention is not limited to the above-described embodiments, and various modifications in design may be made without departing from the spirit and scope of the invention defined in claims.

We claim:

1. A control system for an electric vehicle, comprising:

an inverter which is disposed between a battery and a motor, and which converts a DC electric power of the battery into an AC electric power to supply it to said motor during driving of said motor and converts an AC electric power generated by said motor into a DC electric power to supply it to said battery during regenerative operation of said motor;

a motor control means for controlling the driving and regenerative operation of said motor through said inverter and for conducting a field weakening control in a high revolution range of said motor;

a first power source circuit for supplying an electric power to said motor control means by closing a power source switch operated by a driver;

a motor revolution-number sensor for detecting the number of revolutions of said motor; and a second power source circuit for supplying an electric power to said motor control means when the number of revolutions of said motor detected by said motor revolution-number sensor is equal to or larger than a predetermined value.

2. A control system for an electric vehicle, comprising:

an inverter which is disposed between a battery and a motor, and which converts a DC electric power of the battery into an AC electric power to supply it to said motor during driving of said motor and converts an AC electric power generated by said motor into a DC electric power to supply it to said battery during regenerative operation of said motor;

a motor control means for controlling the driving and regenerative operation of said motor through said inverter and for conducting a field weakening control in a high revolution range of said motor;

a power source switch operated by a driver to supply an electric power to said motor control means;

a motor revolution-number sensor for detecting the number of revolutions of said motor; and a power source circuit for supplying an electric power to said motor control means, when said power source switch is in a closed state, and when the number of revolutions of said motor detected by said motor revolution-number sensor is equal to or larger than a predetermined value.

3. A control system for an electric vehicle according to claim 1 or 2, wherein when said power source switch is in an opened state, said motor control means controls the driving torque of the motor to 0.

4. A control system for an electric vehicle according to claim 3, wherein when the number of revolutions of said motor detected by said motor revolution-number sensor drops to a value less than said predetermined value after said motor control means has controlled the driving torque of the motor to 0, then said motor control means controls the driving torque of the motor by controlling the driving and regenerative operation of the motor.

5. A control system for an electric vehicle, comprising:

an inverter which is disposed between a battery and a motor, and which converts a DC electric power of the battery into an AC electric power to supply it to said motor during driving of said motor and converts an AC electric power generated by said motor into a DC electric power to supply it to said battery during regenerative operation of said motor;

a motor control means for controlling the driving and regenerative operation of said motor through said inverter and for conducting a field weakening control in a high revolution range of said motor;

switch means operated by a driver of the electric vehicle to activate said motor control means;

a motor revolution-number sensor for detecting the number of revolutions of said motor; and means for supplying an electric power to said motor control means, both when said switch means is in a closed state and when the number of revolutions of said motor detected by said motor revolution-number sensor is equal to or larger than a predetermined value even though electric power is not supplied by said switch means.

6. A control system for an electric vehicle according to claim 5, wherein when said switch means is in an opened state, said motor control means controls the driving torque of the motor to 0 (zero) when the number of revolutions of said motor detected by said motor revolution-number sensor is equal to or larger than a predetermined value.

7. A control system for an electric vehicle according to claim 6, wherein when the number of revolutions of said motor detected by said motor revolution-number sensor drops to a value less than said predetermined value after said motor control means has controlled the driving torque of the motor to 0, then said motor control means controls the driving torque of the motor by controlling the driving and regenerative operation of the motor.

* * * * *